(12) United States Patent
Frey et al.

(10) Patent No.: US 9,313,401 B2
(45) Date of Patent: Apr. 12, 2016

(54) FRAME RATE DESIGNATION REGION

(71) Applicant: HERE Global B.V., LB Veldhoven (NL)

(72) Inventors: Sebastian Frey, Woodland Hills, CA (US); Vidyut Samanta, Santa Monica, CA (US); Charlie Sutton, San Francisco, CA (US)

(73) Assignee: HERE Global B.V., Veldhoven (NL)

( * ) Notice: Subject to any disclaimer, the term of this patent is extended or adjusted under 35 U.S.C. 154(b) by 96 days.

(21) Appl. No.: 14/197,117

(22) Filed: Mar. 4, 2014

(65) Prior Publication Data

US 2015/0256749 A1 Sep. 10, 2015

(51) Int. Cl.
*H04N 5/228* (2006.01)
*H04N 7/18* (2006.01)
*H04N 5/232* (2006.01)
*H04N 5/77* (2006.01)

(52) U.S. Cl.
CPC ....... *H04N 5/23245* (2013.01); *H04N 5/23232* (2013.01); *H04N 5/77* (2013.01)

(58) Field of Classification Search
CPC ........... G06T 2207/10016; G06T 2207/10024; G06T 2207/20182; G06T 2207/30201; H04N 9/045; H04N 5/23232; H04N 5/2353; G09G 2310/0267; G09G 2310/04; G09G 2320/106; G09G 2340/0435; G09G 3/2022
USPC ................ 348/94, 155, 208.4, 208.14, 221.1, 348/222.1, 371
See application file for complete search history.

(56) References Cited

U.S. PATENT DOCUMENTS

2010/0231738 A1   9/2010   Border et al.
2010/0231800 A1*  9/2010   White et al. ................. 348/663
2012/0105635 A1   5/2012   Erhardt et al.

FOREIGN PATENT DOCUMENTS

| EP | 1349390 A2 | 10/2003 |
| EP | 2262225 A1 | 12/2010 |
| EP | 2407943 A1 | 1/2012 |
| EP | 2202748 B1 | 7/2013 |
| WO | 92/10908 A2 | 6/1992 |

(Continued)

OTHER PUBLICATIONS

"Innovations", Precoad Inc., Retrieved on Mar. 7, 2014, Webpage available at: http://www.precoad.com/Innovations.html.

(Continued)

*Primary Examiner* — Trung Diep
(74) *Attorney, Agent, or Firm* — Lempia Summerfield Katz LLC

(57) ABSTRACT

A method comprising receiving video information from a camera module such that the video information has a first frame rate, determining that at least a part of an object of interest is represented in the video information within a frame rate designation region of the video information, causing configuration of the camera module to capture the video information at a second frame rate, receiving the video information from the camera module such that the video information has the second frame rate, determining that at least a part of the object of interest is unrepresented in the video information within the frame rate designation region of the video information, causing configuration of the camera module to capture the video information at the first frame rate, and receiving the video information from the camera module such that the video information has the first frame rate is disclosed.

20 Claims, 10 Drawing Sheets

(56) References Cited

FOREIGN PATENT DOCUMENTS

| | | |
|---|---|---|
| WO | 2010/102678 A1 | 9/2010 |
| WO | 2012/100232 A2 | 7/2012 |

OTHER PUBLICATIONS

International Search Report and Written Opinion received for corresponding Patent Cooperation Treaty Application No. PCT/EP2015/054127, dated Apr. 22, 2015, 11 pages.

* cited by examiner

FRAME RATE DESIGNATION REGION

TECHNICAL FIELD

The present application relates generally to determination of a frame rate based, at least in part, on a frame rate designation region.

BACKGROUND

As users have become more accustomed to interacting with electronic apparatuses, users have become more reliant on electronic apparatuses to perform operations. For example, the user may record video with the electronic apparatus, play video on the electronic apparatus, and/or the like. In some circumstances, the manner in which the user operates and/or interacts with the apparatus may be impacted by the configuration in which the electronic apparatus performs operations. In this manner, it may be desirable to allow for configuration and interaction with the apparatus in a simple and intuitive manner.

SUMMARY

Various aspects of examples of the invention are set out in the claims.

One or more embodiments may provide an apparatus, a computer readable medium, a non-transitory computer readable medium, a computer program product, and/or a method for receiving video information from a camera module such that the video information has a first frame rate, determining that at least a part of an object of interest is represented in the video information within a frame rate designation region of the video information, causing configuration of the camera module to capture the video information at a second frame rate, receiving the video information from the camera module such that the video information has the second frame rate, determining that at least a part of the object of interest is unrepresented in the video information within the frame rate designation region of the video information, causing configuration of the camera module to capture the video information at the first frame rate, and receiving the video information from the camera module such that the video information has the first frame rate.

One or more embodiments may provide an apparatus, a computer readable medium, a computer program product, and/or a non-transitory computer readable medium having means for receiving video information from a camera module such that the video information has a first frame rate, means for determining that at least a part of an object of interest is represented in the video information within a frame rate designation region of the video information, means for causing configuration of the camera module to capture the video information at a second frame rate, means for receiving the video information from the camera module such that the video information has the second frame rate, means for determining that at least a part of the object of interest is unrepresented in the video information within the frame rate designation region of the video information, means for causing configuration of the camera module to capture the video information at the first frame rate, and means for receiving the video information from the camera module such that the video information has the first frame rate.

In at least one example embodiment, the frame rate designation region has a width that is less than a representational width of the video information, and the frame rate designation region has a height that is less than a representational height of the video information.

In at least one example embodiment, the representational width is a horizontal span of an image represented by a frame of the video information.

In at least one example embodiment, the representational height is a vertical span of an image represented by a frame of the video information.

In at least one example embodiment, the first frame rate is less than the second frame rate.

One or more example embodiments further perform receipt of information indicative of a frame rate designation region input, and change of the frame rate designation region such that the frame rate designation region corresponds with the frame rate designation configuration input.

In at least one example embodiment, the frame rate designation input designates at least one of a position of the frame rate designation region or a dimension of the frame rate designation region One or more example embodiments further perform causation of display of the video information, and causation of display of a representation of the frame rate designation region in relation to the video information.

In at least one example embodiment, the representation of the frame rate designation region comprises a textual indication of the frame rate designation region.

In at least one example embodiment, the representation of the frame rate designation region is a partially transparent overlay on the video information, such that the representation of the frame designation region has dimensions that correspond with dimensions of the frame rate designation region.

One or more example embodiments further perform receipt of information indicative of a drag input that comprises a contact portion, a movement portion, and a release portion, the contact portion being at a position that corresponds with a position on a boundary of the representation of the frame rate designation region, change of the position of the boundary of the representation of the frame rate designation region based, at least in part, on the movement portion of the drag input, and change of the frame rate designation region such that a boundary of the frame rate designation region corresponds with the boundary of the representation of the frame rate designation region.

In at least one example embodiment, the change of the position of the boundary of the representation of the frame rate designation region comprises at least one of repositioning of the representation of the frame rate designation region or changing a dimension of the representation of the frame rate designation region.

One or more example embodiments further perform storage of the video information in a repository, retrieval of repository video information from the repository, identification of a portion of the repository video information that has a frame rate higher than a different frame rate of a different portion of the repository video information, and causation of rendering of the repository video information such that the portion of the repository video information is rendered at slow speed, and the different portion of the repository video information is rendered at normal speed.

In at least one example embodiment, the normal speed is substantially equal to the different frame rate.

In at least one example embodiment, substantially equal to refers to a difference between the normal speed and the different frame rate being within a similarity tolerance within which the difference is non-perceivable to a user.

In at least one example embodiment, the slow speed is substantially less than the frame rate.

In at least one example embodiment, substantially less than refers to a difference between the slow speed and the frame rate being outside of a similarity tolerance beyond which the difference is perceivable to a user.

In at least one example embodiment, the slow speed is substantially equal to the different frame rate.

In at least one example embodiment, substantially equal to refers to a difference between the slow speed and the different frame rate being within a similarity tolerance within which the difference is non-perceivable to a user.

One or more example embodiments further perform determination of a cropped region of the portion of the video repository information, wherein rendering of the portion of the repository video information precludes rendering of the portion of the repository video information that is beyond the cropped region.

In at least one example embodiment, the cropped region corresponds with the frame rate designation region.

In at least one example embodiment, rendering of the portion of the repository video information is performed such that the cropped region is zoomed.

In at least one example embodiment, the cropped region being zoomed refers to an increase of the displayed size of the cropped region.

In at least one example embodiment, the determination that at least a part of the object of interest is represented in the video information within the frame rate designation region comprises identification of motion represented by the video information within the frame rate designation region.

In at least one example embodiment, the determination that at least a part of the object of interest is unrepresented in the video information within the frame rate designation region comprises determination of lack of motion represented by the video information within the frame rate designation region.

In at least one example embodiment, the determination that at least a part of the object of interest is represented in the video information within the frame rate designation region comprises identification of the object of interest represented by the video information within the frame rate designation region.

In at least one example embodiment, the determination that at least a part of the object of interest is unrepresented in the video information within the frame rate designation region comprises determination that the video information within the frame rate designation region is absent a representation of the object of interest.

In at least one example embodiment, causation of configuration of the camera module to capture the video information at a particular frame rate comprises sending the particular frame rate to the camera module.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
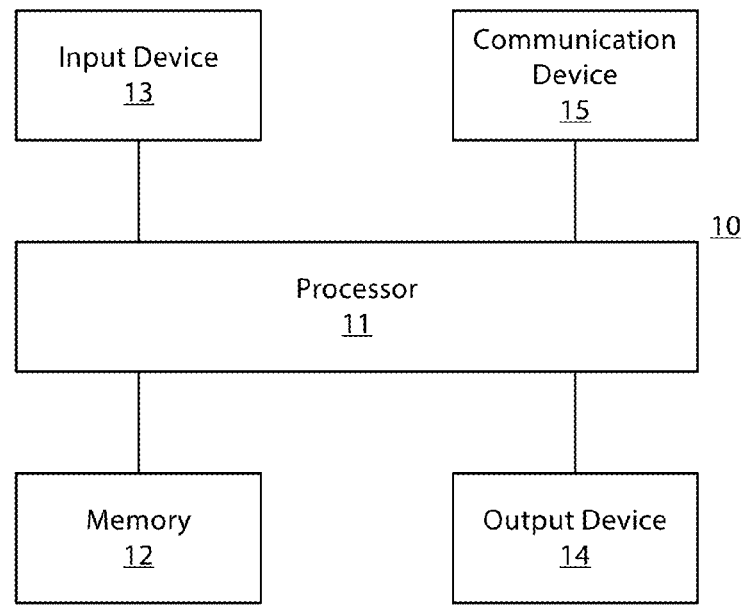
FIG. 1 is a block diagram showing an apparatus according to at least one example embodiment.

An embodiment of the invention and its potential advantages are understood by referring to FIGS. 1 through 11 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one example embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display, or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
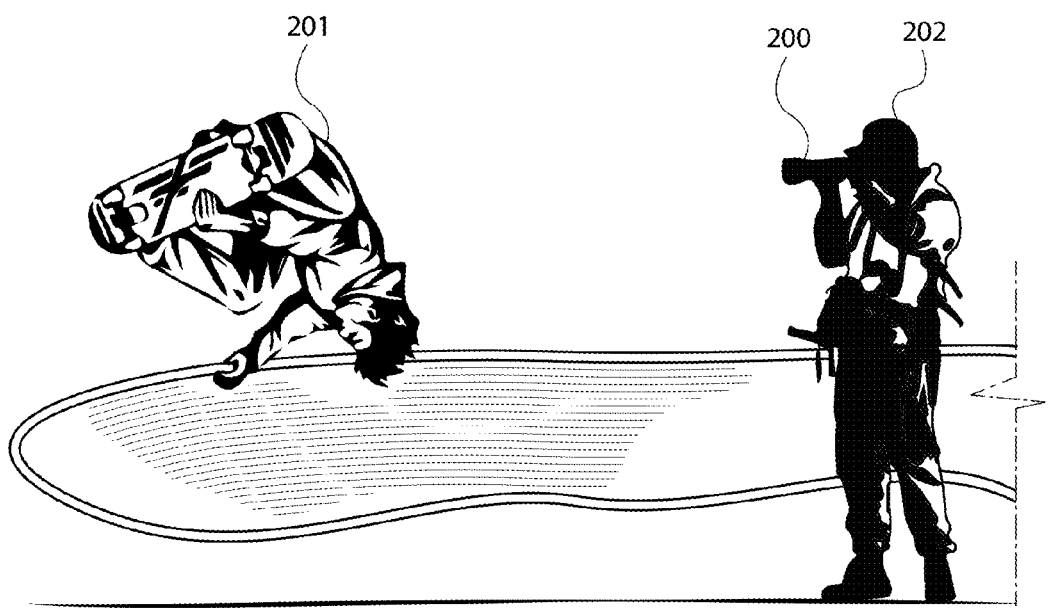
FIG. 2 is a diagram illustrating the capture of video information according to at least one example embodiment.

FIG. 2 is a diagram illustrating the capture of video information according to at least one example embodiment. The example of FIG. 2 is merely an example and does not limit the scope of the claims. For example, the video information may vary, the camera module may vary, the repository may vary, and/or the like.

In many circumstances, a user will observe and experience his surroundings. The user's perception of his observations and experiences at a particular time may be described as a moment in time. Often when a user is experiencing a moment in time, it may be desirable to record the moment in time for later viewing. For example, the user may wish to view the moment in time again at a later time, share the moment in time with other people, and/or the like. In many circumstances, the user may record the moment in time by storing video information received from a camera module, wherein the video information is representative of the moment in time. The video information may comprise a still image, a moving image, a portion of a still image, a portion of a moving image, a video, a portion of a video, and/or the like.

The example of FIG. 2 illustrates apparatus 200 capturing video information of object 201. In the example of FIG. 2, apparatus 200 is operated by user 202. In the example of FIG. 2, apparatus 200 comprises a camera module similar as described regarding FIG. 1. It can be seen that object 201 is a moving object that is moving in front of apparatus 200. Even though the example of FIG. 2 illustrates apparatus 200 being operated directly by user 202, apparatus 200 may also be operated indirectly, such as by a timer, a remote control, and/or the like. Even though the example of FIG. 2 illustrates apparatus 200 as a single integrated device, in some instances apparatus 200 may comprise multiple devices in communication with one another.

Under many circumstances, it may be desirable for an apparatus comprising a camera module to recognize that an object is an object of interest. An object of interest may be an object that triggers a response in a camera module. An object of interest may trigger a response in a camera module in a number of ways. For instance, the object of interest may enter a camera module's field of view, enter a specific region within a camera module's area of capture, begin moving within a camera module's area of capture while having previously been stationary, and/or the like. For example, object 201 of FIG. 2 may enter an area of capture of apparatus 200. This entering of the area of capture may trigger a response in apparatus 200, such as starting a recording process, causing apparatus 200 to present information to user 202, and/or the like.

Under some circumstances, it may be desirable for a camera module to capture video at different frame rates. For example, a user may wish to capture video at high resolution with a low frame rate, to conserve storage space while retaining a high image quality. In another example, a user may wish to capture video at a high frame rate for later viewing in slow motion. In at least one example embodiment, the apparatus receives video information from a camera module such that the video information has a frame rate. A Frame rate may be a frequency that a camera module captures consecutive frames. A frame may be a representation of a single image or portion of a single image from a series of consecutive images that comprise a moving image, a single field or portion of a single field from a series of consecutive fields that comprise a video, and/or the like. In at least one example embodiment, the apparatus causes configuration of the camera module to capture the video information at a different frame rate. For example, the camera module may be capturing video information at a frame rate of thirty frames per second. The apparatus may then cause configuration of the camera module to capture video information at a frame rate of sixty frames per second. In at least one example embodiment, the causation of configuration of the camera module to capture the video information at a different frame rate comprises sending the different frame rate to the camera module. In at least one example embodiment, the apparatus receives the video information from the camera module such that the video information has the different frame rate. For example, the sending of the different frame rate to the camera module may cause the camera module to capture the video information at the different frame rate.

Often, it may be desirable to store video information received from a camera module. For example, as previously described, a user may wish to record a moment in time so that the user may re-experience the moment in time at a later time. In at least one example embodiment, the apparatus stores the video information in a repository. A repository may be any storage device that is capable of storing the video information in a manner such that the video information may be retrieved in the future. Examples of a repository may include photographic film, magnetic tape, electronic memory devices comprised by the apparatus, electronic memory devices external to the apparatus, and/or the like.

Figure 3A:
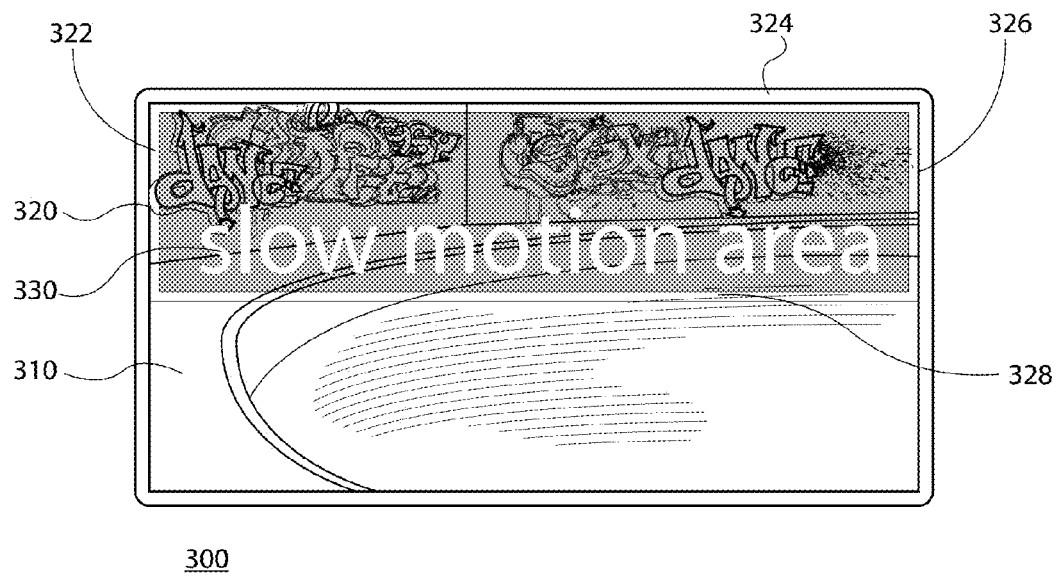
FIGS. 3A-3B are diagrams illustrating a frame rate designation region according to at least one example embodiment.
Figure 3B:
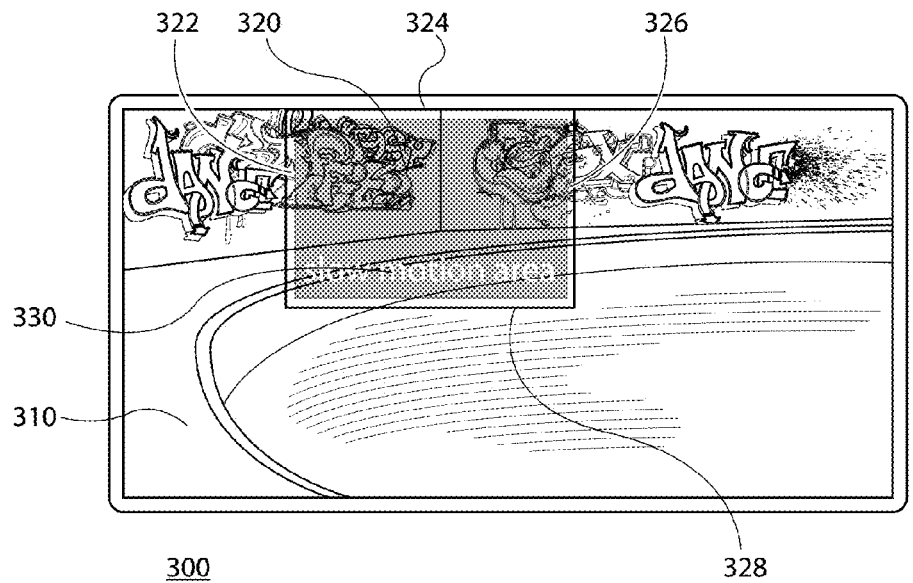

FIGS. 3A-3B are diagrams illustrating a frame rate designation region according to at least one example embodiment. The examples of FIGS. 3A-3B are merely examples and do not limit the scope of the claims. For example, the number of frame rate designation regions may vary, the number of frame rates may vary, the number of objects of interest may vary, and/or the like.

Often when recording video information, it may be desirable to capture video information at various frame rates when an object of interest is within different areas of the area of capture of a video module. For example, a user may wish to capture video information at thirty frames per second in some circumstances, and the user may wish to capture video information at sixty frames per second in other circumstances. For example, the user may desire to capture particular events that occur within the video information at a higher frame rate than that of other segments of the video information. For example, the user may desire to view a particular event in slow motion.

Under such circumstances, the user may desire to have the segment of the video information that represents the occurrence of the event to have a higher frame rate than other segments of the video. For example, the user may desire the slow motion to be fluid in the same manner as the non-slow motion segments of the video information.

In many circumstances, it may be desirable for the user to avoid manually changing the frame rate of the video information while capturing the video information. For example, the user may desire to have the apparatus automatically change from the low frame rate to the high frame rate, from the high frame rate to the low frame rate, and/or the like. In some circumstances, the user may be aware of particular areas in which such an event may occur. For example, the user may desire to capture scoring events of a sporting event at a higher frame rate than non-scoring events. In such an example, the user may desire the apparatus to automatically change from the low frame rate to the high frame rate when activity is occurring near a goal, when a ball is near the goal, when a player is near the goal, and/or the like. In this manner, the user may desire the apparatus to change the frame rate of the video information based, at least in part, on occurrences within a particular region of space, a particular region within the video information, and/or the like.

In this manner, it may be desirable for the apparatus to determine a frame rate based, at least in part, on events that are represented within a frame rate designation region of the video information. In at least one example embodiment, the apparatus determines that at least a part of an object of interest is represented in the video information within the frame rate designation region of the video information. An object may be represented in the video information in circumstances where the object is within an area of capture of a camera module. In at least one example embodiment, the frame rate designation region is a positional region within the video information. The frame rate designation region may indicate a region within which the user desires to capture events at a different frame rate than events that occur outside of the frame rate designation region. For example, the video information may comprise a visual representation of the object of interest, there may be movement in the video information that indicates presence of a representation of the object of interest within the frame rate designation region, and/or the like.

The example of FIGS. 3A-3B, illustrates representation of video information 300 comprising representation of capture region 310 and representation of frame rate designation region 320. Representation of video information 300 is representative of video information captured by a video module. For example, representation of video information 300 may be representative of video information captured by apparatus 200 of FIG. 2. Representation of capture region 310 is representative of an area that falls within the capture region of a camera module. For example, representation of capture region 310 may be representative of an area within the capture region of apparatus 200 of FIG. 2. Representation of frame rate designation region 320 is representative of a frame rate designation region associated with the video information represented by representation of video information 300. For example, representation of frame rate designation region 320 may be representative of a frame rate designation region of video information captures by apparatus 200 of FIG. 2. Representation of frame rate designation region 320 comprises left boundary 322, upper boundary 324, right boundary 326, lower boundary 328, and textual indication 330. Even though representation of frame rate designation region 320 comprises four boundaries in the example of FIGS. 3A-3B, under certain circumstances representation of frame rate designation region 320 may comprise additional boundaries or fewer boundaries. It can be seen in FIGS. 3A-3B that representation of capture region 310 comprises all parts of representation of video information 300 that fall outside the bounds of representation of frame rate designation region 320. It should be understood that representation of representation of capture region 310 further comprises all parts of representation of video information 300 that fall within the bounds of representation of frame rate designation region 320.

In many circumstances, a user may wish to capture video information in which the frame rate has a particular frame rate, for example a higher frame rate, when an object of interest is within the frame rate designation region, and has different frame rate, for example a lower frame rate, when the object of interest is outside the frame rate designation region.

Oftentimes it may be desirable to display a representation of video information to a user. For example, when the user is able to see a representation of the video information, they may have a better understanding of the manner in which video information is being captured. For instance, the representation of the video information may be displayed in relation to a capture region and/or a frame rate designation region. For example, there may be a viewfinder program operating on the apparatus that may be used for viewing video information that is being captured. For example, the viewfinder may indicate video that is being received from the camera module.

In at least one example embodiment, the apparatus causes display of the video information. For example, the apparatus may comprise a viewfinder program that may be utilized for receiving the video information. In such an example, the viewfinder program may be utilized for display of the video information. In at least one example embodiment, the apparatus causes display of a representation of the frame rate designation region in relation to the video information. In many instances it may be desirable that the representation of the frame rate information comprise an indication of the frame rate designation region. For example, this indication may help the user to determine which portion of the video information comprises the frame rate designation region. In at least one example embodiment, the representation of the frame rate designation region comprises a textual indication of the frame rate designation region. In at least one example embodiment, the representation of the frame rate designation region is a partially transparent overlay on the video information, such that the representation of the frame designation region has dimensions that correspond with dimensions of the frame rate designation region. A partially transparent overlay may be a technique which provides a contrast between a video region that falls within the overlay and a video region outside the overlay in a manner that the information within the overlay region is still visible. For example, a video region within a partially transparent overlay may have a different color tint than a video region outside the overlay. For instances, in the example illustrated by FIGS. 3A-3B, representation of frame designation region 320 may be rendered so that it has a slightly different color tint than representation of video information 310.

In at least one example embodiment, the frame rate designation region has a width that is less than a representational width of the video information. In at least one example embodiment, the representational width is a horizontal span of an image represented by a frame of the video information. For example, a frame rate designation region may be similar as illustrated in FIG. 3B. In the example of FIG. 3B it can be seen that the area between left boundary 322 and right boundary 326 of representation of frame designation region 320 has a width less than the width of representation of video information 300. In at least one example embodiment, the frame rate designation region has a height that is less than a representational height of the video information. In at least one example embodiment, the representational height is a vertical span of an image represented by a frame of the video information. For example, a frame rate designation region may be similar as illustrated in FIGS. 3A-3B. In the example of FIGS. 3A-3B it can be seen that the area between upper boundary 324 and lower boundary 328 of representation of frame designation region 320 has a height less than the height of representation of video information 300.

Under many circumstances, it may be desirable for a user to designate a particular region within the video information as the frame rate designation region. For example, the user may desire the upper portion of the video information to be designated as the frame rate designation region. For example, the user may desire the frame rate designation region to be similar to the frame rate designation region represented by FIG. 3A, where representation of frame rate designation region 320 is in the upper region of representation of video information 300. In some circumstances, a user may wish to relocate and/or resize an existing frame rate designation region.

In at least one example embodiment, the apparatus receives information indicative of a frame rate designation region input. In at least one example embodiment, frame rate designation input is an input received from a user that indicates that the user wishes to relocate and/or resize a frame rate designation region, create a new frame rate designation region, and/or the like. In at least one example embodiment, the frame rate designation input designates a dimension of the frame rate designation region. For example, the frame rate designation region input may indicate movement, for example by way of a drag input, of a corner of a boundary of the frame rate designation region, a side of the frame rate designation region, and/or the like. A drag input may be a touch input. In at least one example embodiment, a drag input comprises a contact portion, a movement portion, and a release portion. In at least one example embodiment, the contact portion of a drag frame rate designation region input is at a position that corresponds with a position on a boundary of the representation of the frame rate designation region.

In at least one example embodiment, the frame rate designation input is an input that, at least partially, corresponds with a boundary of the representation of the frame rate designation region, such as a drag input, a swipe input, and/or the like. In at least one example embodiment, the apparatus changes the frame rate designation region such that frame rate designation region corresponds with the frame rate designation configuration input. For example, in circumstances where the frame rate designation region input is a drag input, the apparatus may adjust the boundary in proportion to the movement of the drag input. In at least one example embodiment, the apparatus changes the frame rate designation region such that a boundary of the frame rate designation region corresponds with the boundary of the representation of the frame rate designation region.

For example, the user may perform a drag input on a touch display that is displaying representation of video information 300. In such an example, the input may correspond with the corners of the boundary of representation of video information 320. The apparatus may interpret such a drag input as a frame rate designation region input. The apparatus may set the boundary of the representation of the frame rate designation region based, at least in part, on the frame rate designation region input. In such an example, the apparatus may change the frame rate designation region such that it corresponds with the frame rate designation region represented by representation of frame rate designation region 320. For instance, a user may enter a series of drag inputs in such a manner that left boundary 22 and right boundary 326 are moved from their positions in FIG. 3A to their positions in FIG. 3B. In this manner, the apparatus may change the frame rate designation region represented by representation of frame rate designation region 320 such that it corresponds to the position indicated in FIG. 3B, when the frame rate designation region previously corresponded with the position of representation of frame rate designation region 320 in FIG. 3A.

In at least one example embodiment, the apparatus changes the position of the boundary of the representation of the frame rate designation region. In at least one example embodiment, the frame rate designation input designates a position of the frame rate designation region. In this manner, the change of the position of the boundary of the representation of the frame rate designation region may comprise at least one of repositioning of the representation of the frame rate designation region. In this manner, the change of the position of the boundary of the representation of the frame rate designation region may be based, at least in part, on the movement portion of the drag input.

Figure 4A:
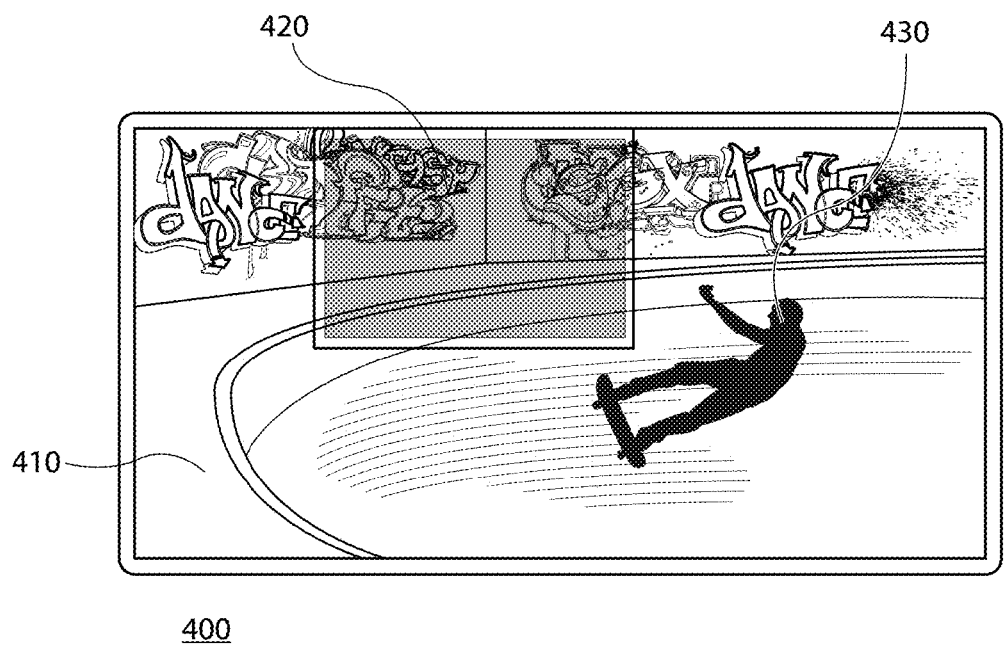
FIGS. 4A-4B are diagrams illustrating a determination that at least a part of an object of interest is represented in video information within a frame rate designation region of the video information according to at least one example embodiment.
Figure 4B:
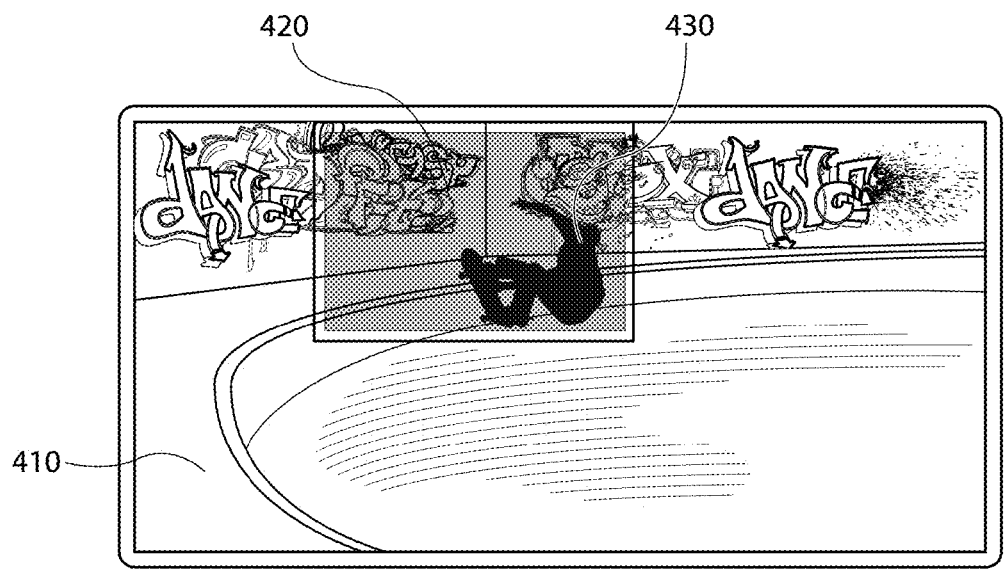

FIGS. 4A-4B are diagrams illustrating a determination that at least a part of an object of interest is represented in video information within a frame rate designation region of the video information according to at least one example embodiment. The examples of FIGS. 4A-4B are merely examples and do not limit the scope of the claims. For example, the number of frame rate designation regions may vary, the number of frame rates may vary, the number of objects of interest may vary, and/or the like.

As previously described, when capturing video information it may be desirable to capture video information at different frame rates when an object of interest is within different areas of the area of capture of a video module. Under many such circumstances, it may be desirable to determine when a least part of an object of interest is represented within a frame rate designation region. For example, the determination could be used to trigger a change in frame rate for the capturing of video information.

The example of FIGS. 4A-4B illustrates video information 400. Video information 400 comprises capture region 410, frame rate designation region 420, and object of interest 430. Video information 400 illustrates an example of video information captured by a video module. For example, video information may be video information captured by apparatus 200 of FIG. 2. Capture region 410 illustrates an example of an area that falls within the capture region of a camera module. For example, capture region 410 may be an area within the capture region of apparatus 200 of FIG. 2. Frame rate designation region 420 illustrates an example of a frame rate designation region associated with video information 400. For example, frame ration designation 420 may be a frame rate designation region of video information captured by apparatus 200. It can be seen in FIGS. 4A-4B that representation of capture region 410 comprises the portion of video information 400 that is outside of frame rate designation region 420. It should be understood that that capture region 410 further comprises the portion of video information 400 that is within frame rate designation region 420. In the example of FIG. 4A, it can be seen that object of interest 430 is unrepresented within the frame rate designation region 420. In the example of FIG. 4B, it can be seen that at least part of object of interest 430 is represented within the frame rate designation region 420. A user may desire to capture video information at a particular frame rate in the circumstances of the example of FIG. 4A, and may desire to capture the video information at a different frame rate in the circumstances of the example of FIG. 4B.

In at least one example embodiment, the apparatus causes configuration of a camera module to capture video information at a frame rate. In at least one example embodiment, the apparatus determines that at least a part of the object of interest is unrepresented in the video information within the frame rate designation region of the video information. An object of interest may be similar as described in regards to FIG. 2. In this manner, the apparatus may cause of configuration of the camera module to capture the video information at the first frame rate based, at least in part, on the determination that at least a part of the object of interest is unrepresented in the video information within the frame rate designation region of the video information. For example, in circumstances where apparatus 200 is capturing video information 400 as illustrated in FIG. 4A, the apparatus may cause configuration of the camera module to capture video information at thirty frames per second. In this manner, the apparatus may receive the video information from the camera module such that the video information has the frame rate of thirty frames per second.

In at least one example embodiment, the determination that at least a part of the object of interest is unrepresented in the video information within the frame rate designation region comprises determination of lack of motion represented by the video information within the frame rate designation region. Lack of motion may refer to the circumstance that the object of interest is maintaining a steady position relative to its surroundings. In this manner, the lack of motion may indicate that any object within the region is not of interest. Therefore in circumstances where the object of interest is detected by way of motion detection, the physical object of interest may be at a physical location that corresponds with the frame rate designation region even though the apparatus may determine that at least part of the object of interest is unrepresented in the video information within the frame designation region based, at least in part, on the lack of motion. Lack of motion may be determined by way of a motion detection algorithm. Motion detection may be a process of detecting a change in position of an object of interest relative to its surroundings. Motion detection may include mechanical detection methods, electronic detection methods, software detection methods, and/or the like.

In at least one example embodiment, the determination that at least a part of the object of interest is unrepresented in the video information within the frame rate designation region comprises determination that the video information within the frame rate designation region is absent a representation of the object of interest. Determination that the video information within the frame rate designation region is absent a representation of the object of interest of the object of interest may be performed by way of object recognition. For example, the apparatus may utilize face identification to determine a point that corresponds with a part of the visual information that represents a person's face. In another example, the apparatus may identify a moving object in the visual information to determine a point that corresponds with the moving object, for example, by way of object tracking. In this manner, the point may identify a position within the visual information to be tracked. In many circumstances, it may be desirable for a user to designate an object for the apparatus to identify. In at least one example embodiment, the apparatus receives information indicative of an object identification input. In this manner, the identification of the object may be based, at least in part, on the object identification input. The object identification input may be any type of input that designates an object.

In at least one example embodiment, the apparatus determines that at least a part of an object of interest is represented in the video information within a frame rate designation region of the video information. The apparatus may cause configuration of the camera module to capture the video information at a different frame rate based, at least in part, on the determination that at least a part of the object of interest is represented in the video information within the frame rate designation region. For example, in circumstances where apparatus 200 is capturing video information 400 as illustrated in FIG. 4B, the apparatus may cause configuration of the camera module to capture video information at sixty frames per second. In this manner, the apparatus may receive the video information from the camera module such that the video information has the different frame rate of sixty frames per second. In such an example, the frame rate of the example of FIG. 4A is less than the different frame rate of the example of FIG. 4B. Even though the previous example described the frame rate associated with the object of interest being outside of the frame rate designation region being a lower frame rate than the different frame rate associated with the object of interest being within the frame rate designation region, in some examples, the relationship between the frame rate and the different frame rate may differ.

In at least one example embodiment, the determination that at least a part of the object of interest is represented in the video information within the frame rate designation region comprises identification of motion represented by the video information within the frame rate designation region. Identification of motion may be determined by way of a motion detection algorithm, similarly as previously described. In at least one example embodiment, the determination that at least a part of the object of interest is represented in the video information within the frame rate designation region comprises identification of the object of interest represented by the video information within the frame rate designation region. Identification of the object of interest may be performed by way of object recognition, similar as previously described.

In many circumstances, it may be desirable for video information to comprise more than one frame rate designation region. For example, a user may wish to capture video information at more than one different frame rate. For instance, a user may wish to capture a portion of the video information at a first different frame rate of sixty frames per second, and may wish to capture a different portion of the video information at a second different frame rate of ninety frames per second. In this example, the video information may comprise a different frame rate designation region for each different frame rate. In some instances, different frame rate designation regions may be completely separate from each other. In some instances different frame rate designation regions may share at least one common boundary. In some instances a frame rate designation region may fall entirely within the boundaries of a different frame rate designation region. In this manner, the apparatus may cause configuration of the camera module to capture video information at a different frame rate that corresponds with the different frame rate designation region when at least part of an object of interest is represented within the different frame rate designation region. In many circumstances it may be desirable to transition from a frame rate to a different frame rate gradually. For example, a gradual frame rate transition may permit smoother playback of video information. In some instances the apparatus may cause configuration of the camera module to gradually ramp up or gradually ramp down the frame rate when transitioning between capturing video at a first frame rate and capturing video at a second frame rate. For example, the apparatus may cause configuration of the camera module to gradually ramp up from capturing thirty frames per second to capturing sixty frames per second when an object crosses a frame rate designation boundary, rather than immediately capturing at sixty frames per second.

FIGS. 5A-5D are diagrams illustrating the rendering of repository video information according to at least one example embodiment. The examples of FIGS. 5A-5D are merely examples and do not limit the scope of the claims. For example, the repository may vary, the repository video information may vary, the rendering apparatus may vary, and/or the like.

In many circumstances, it may be desirable to view video information that was previously recorded. For example, a user may wish to share the video information with another person. In at least one example embodiment, the apparatus retrieves repository video information from the repository. Repository video information may be video information that was previously stored in the repository. For example, the repository video information may be a file stored in non-volatile memory. In at least one example embodiment, the apparatus causes rendering of the repository video information. In this manner, the user may view the repository video information by way of the rendering.

Figure 5A:
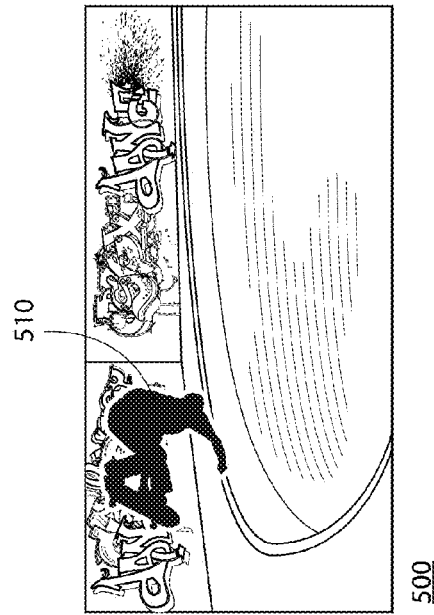
FIGS. 5A-5D are diagrams illustrating the rendering of repository video information according to at least one example embodiment.
Figure 5B:
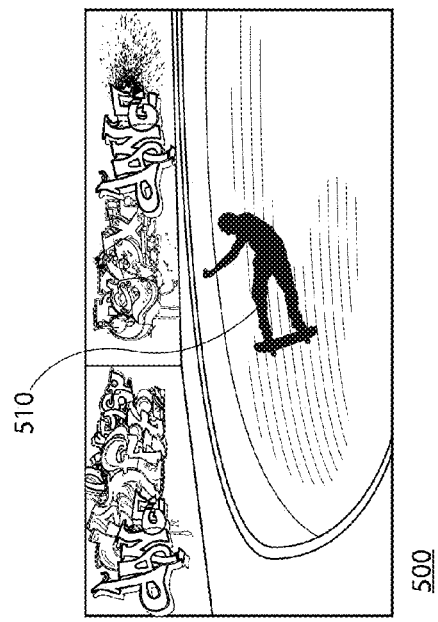
Figure 5C:
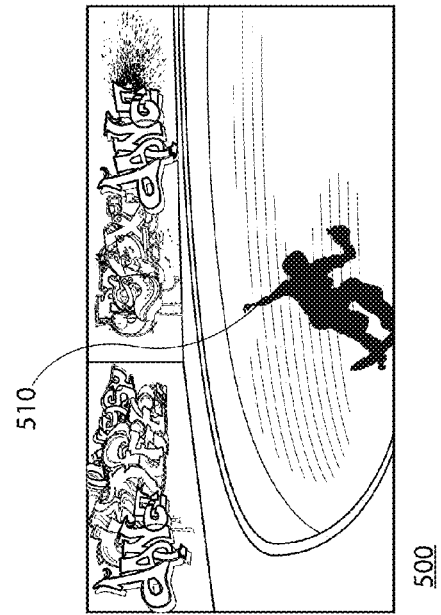
Figure 5D:
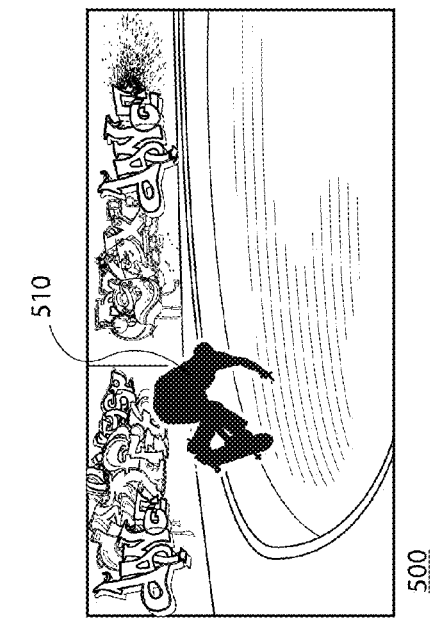

FIGS. 5A-5D illustrates rendering of repository video information 500. The examples of FIGS. 5A-5D may be indicative of video information that was captured in the examples of FIGS. 4A-4B. Repository video information 500 depicts an object 510 moving along a path. FIG. 5A illustrates repository video information at 500 at a time before FIGS. 5B-5D. FIG. 5B illustrates repository video information 500 at a time after FIG. 5A and before FIGS. 5C-D. FIG. 5C illustrates repository video information 500 at a time after FIGS. 5A-5B and before FIG. 5D. FIG. 5D illustrates repository video information at 500 at a time after FIGS. 5B-5D.

Under some circumstances it may be desirable to render repository video information at a frame rate that is different from the frame rate at which the repository video information was captured. For example, it may be desirable to render the repository video information at a slower frame rate than the frame rate the repository video information was captured in order to give the rendering a slow motion effect. In another example, it may be desirable to render the repository video information at a faster frame rate than the frame rate the repository video information was captured in order to give the rendering a fast forward effect. In some circumstances, different portions the same repository video information may have been captured at different frame rates. It may be desirable in many of these circumstances to identify these different frame rates in the repository information. In this manner, the frame rate of the rendering can be adjusted such that the repository video information is rendered at the desired speed. For example, a portion of the video information may have been captured at a higher frame rate that the remainder of the video information for the purpose of providing for a slow motion effect.

In a least one example embodiment, the apparatus identifies a portion of the repository video information that has a frame rate higher than a different frame rate of a different portion of the repository video information. For example, the frame rate of repository video information 500 may have been captured at thirty frames per second at times associated with FIGS. 5A and 5D, and repository video information 500 may have been captured at sixty frames per second at times associated with FIGS. 5B and 5C. The identification may be based, at least in part, on metadata associated with the repository video information, recognizing frame rate information that is part of the repository video information, and/or the like. In at least one example embodiment, the apparatus causes rendering of the repository video information such that the portion of the repository video information is rendered at slow speed, and the different portion of the repository video information is rendered at normal speed.

In at least one example embodiment, the normal speed is substantially equal to the frame rate of the video information. In at least one example embodiment, substantially equal to refers to a difference between the normal speed and the different frame rate being within a similarity tolerance within which the difference is non-perceivable to a user. In at least one example embodiment, the slow speed is substantially less than the frame rate of the video information. In at least one example embodiment, substantially less than refers to a difference between the slow speed and the frame rate being outside of a similarity tolerance beyond which the difference is perceivable to a user. In at least one example embodiment the slow speed is substantially equal to a frame rate of another portion of the video information. For example, in circumstances where the video information comprises video information having a greater frame rate, and video information having a lesser frame rate, the slower speed may refer to rendering of the video information having a greater frame rate at the lesser frame rate. In at least one example embodiment substantially equal to refers to a difference between the slow speed and the frame rate of the other portion of the video information being within a similarity tolerance within which the difference is non-perceivable to a user.

For example, the frame rate of repository video information 500 may have a frame rate of thirty frames per second at times associated with FIGS. 5A and 5D, and may have a frame rate of sixty frames per second at times associated with FIGS. 5B and 5C. In such an example, the apparatus may render the repository video information associated with FIGS. 5A and 5D at a normal speed of thirty frames per second, and render the repository video information associated with FIGS. 5B and 5C at a slow speed of less than sixty frames per second. For example, the apparatus may render the repository video information associate with FIGS. 5B and 5C at thirty frames per second. In this manner, such rendering may be consistent with a slow motion effect when rendering the repository video information associated with FIGS. 5B and 5C.

Figure 6A:
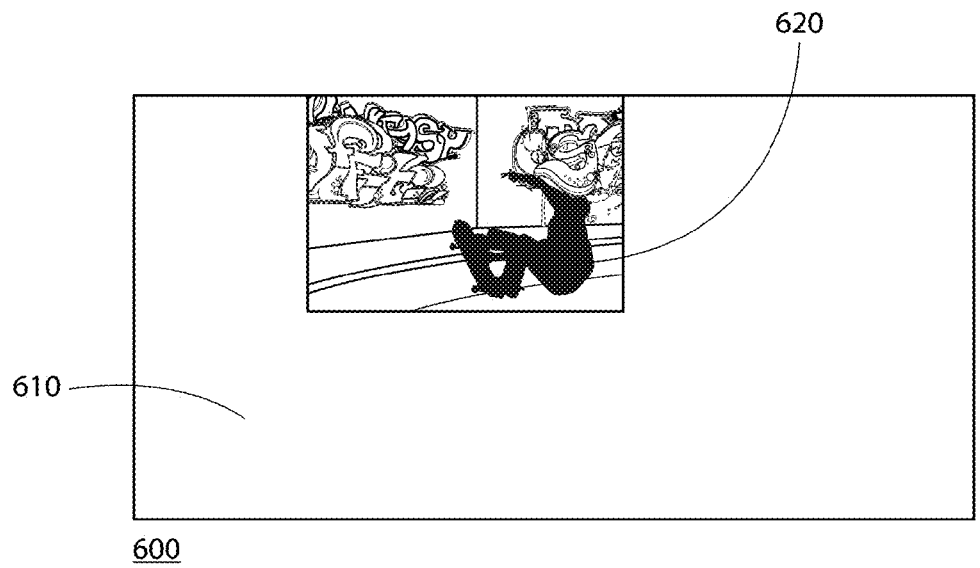
FIGS. 6A-6B are diagrams illustrating the rendering of a portion of repository video information according to at least one example embodiment.
Figure 6B:
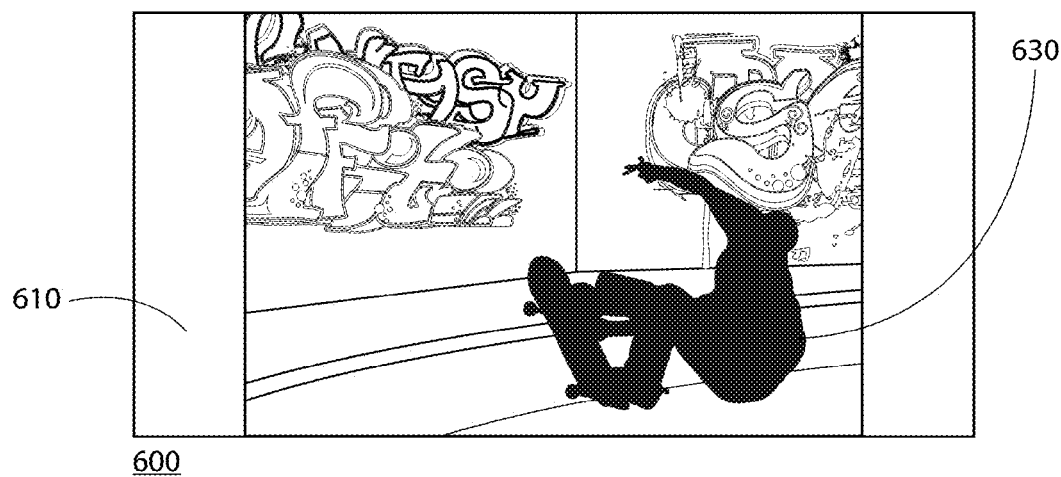

FIGS. 6A-6B are diagrams illustrating the rendering of a portion of repository video information according to at least one example embodiment. The examples of FIGS. 6A-6B are merely examples and do not limit the scope of the claims. For example, the repository may vary, the repository video information may vary, the rendering apparatus may vary, and/or the like.

In some circumstances it may be desirable to render only a portion of repository video information. For example, rendering only a portion of the repository video information may help draw the attention of the user viewing the rendering to an object of interest. For instance, a portion of the repository video information may be a cropped region of the video information. By rendering the cropped region instead of the entirety of the video information, the user's attention may be drawn to the cropped region. Under some circumstances it may be desirable to rescale the portion of the repository video information. For example, the portion of the repository video information may be zoomed in a manner that the cropped region takes up more area on a display upon which the repository video information is being rendered.

FIGS. 6A-6B illustrate a portion of repository video information 600. It can be seen in FIGS. 6A-6B that region 610 of video repository information 600 is not rendered. FIG. 6A illustrates cropped region 620. Cropped region 620 is a portion of repository information 600. It can be seen that cropped region 620 is rendered at approximately a size that cropped region 620 would be rendered in circumstances where region 610 were also rendered. For example, the size of cropped region 620 corresponds with the size of cropped region 620 with respect to the entirety of video repository information 600. FIG. 6B illustrates a zoomed cropped region 630. It can be seen that zoomed cropped region 630 comprises an identical portion of repository information as cropped region 620 of FIG. 6B, such that zoomed cropped region 630 is rendered at a larger size than cropped region 620.

In at least one example embodiment, the apparatus determines a cropped region of the portion of the repository video information. The determination may be based, at least in part, on metadata associated with the repository video information, a user input, an indicator within the repository video information, and/or the like. In this manner, the rendering of the portion of the repository video information may preclude rendering of the portion of the repository video information that is beyond the cropped region. For example, the apparatus may render repository video information 600 as illustrated in FIG. 6A. For instance, the apparatus may determine cropped region 620 and preclude rendering the portion of video repository information 600 that is within region 610. In such an example, the apparatus may render the portion of the repository video information 600 that is within cropped region 620. In at least one example embodiment, the cropped region corresponds with the frame rate designation region. For example, cropped region 620 may correspond with the frame rate designation region represented by representation of frame rate region 320 as illustrated in FIG. 3B. In this manner, the cropped region may correspond with a different frame rate during rendering.

In at least one example embodiment, the rendering of the portion of the repository video information is performed such that the cropped region is zoomed. In at least one example embodiment, the cropped region being zoomed refers to an increase of the displayed size of the cropped region. For example, the apparatus could render repository video information 600 as illustrated in FIG. 6B. For instance, the apparatus would determine cropped region 630 and preclude rendering the portion of video repository information 600 within region 610 while rendering the portion of the repository video information 600 within cropped region 630 such that cropped region 630 is zoomed.

Figure 7:
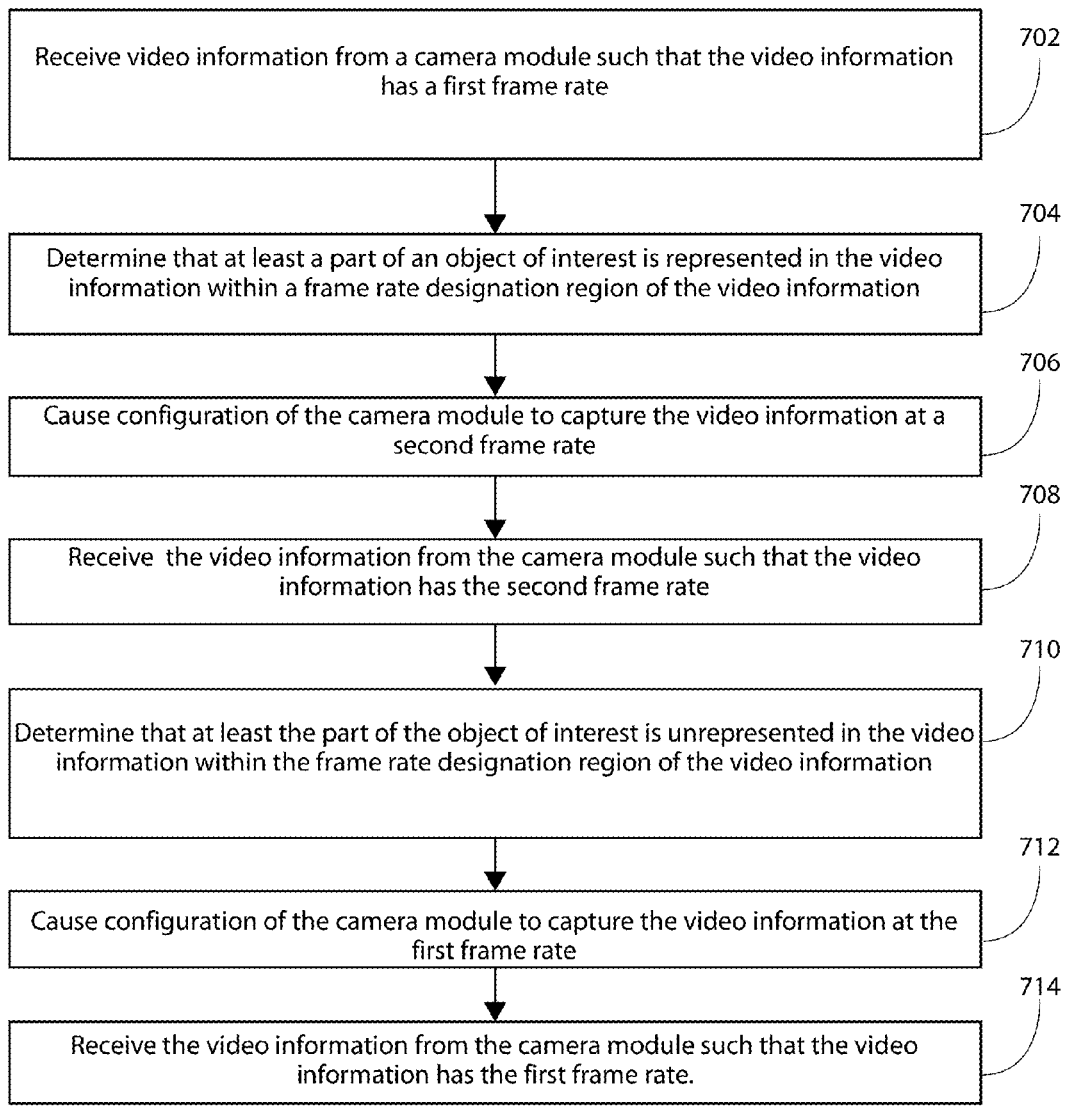
FIG. 7 is a flow diagram illustrating activities associated determination of a frame rate based, at least in part, on a frame rate designation region according to at least one example embodiment.

FIG. 7 is a flow diagram illustrating activities associated with determination of a frame rate based, at least in part, on a frame rate designation region according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus receives video information from a camera module such that the video information has a first frame rate. The receipt, the video information, the camera module, and the first frame rate may be similar as described regarding FIG. 2.

At block 704, the apparatus determines that at least a part of an object of interest is represented in the video information within a frame rate designation region of the video information. The determination, the object of interest, and the frame rate designation region may be similar as described regarding FIG. 2, FIGS. 3A-3B, and FIGS. 4A-4B.

At block 706, the apparatus causes configuration of the camera module to capture the video information at a second frame rate. The causation, the capture, and the second frame rate may be similar as described regarding FIG. 2 and FIGS. 4A-4B.

At block 708, the apparatus receives the video information from the camera module such that the video information has the second frame rate. The receipt may be similar as described regarding FIG. 2 and FIGS. 4A-4B.

At block 710, the apparatus determines that at least the part of the object of interest is unrepresented in the video information within the frame rate designation region of the video information. The determination may be similar as described regarding FIGS. 4A-4B.

At block 712, the apparatus causes configuration of the camera module to capture the video information at the first frame rate. The configuration may be similar as described regarding FIG. 2 and FIGS. 4A-4B.

At block 714, the apparatus receives the video information from the camera module such that the video information has the first frame rate. The receipt may be similar as described regarding FIG. 2 and FIGS. 4A-4B.

Figure 8:
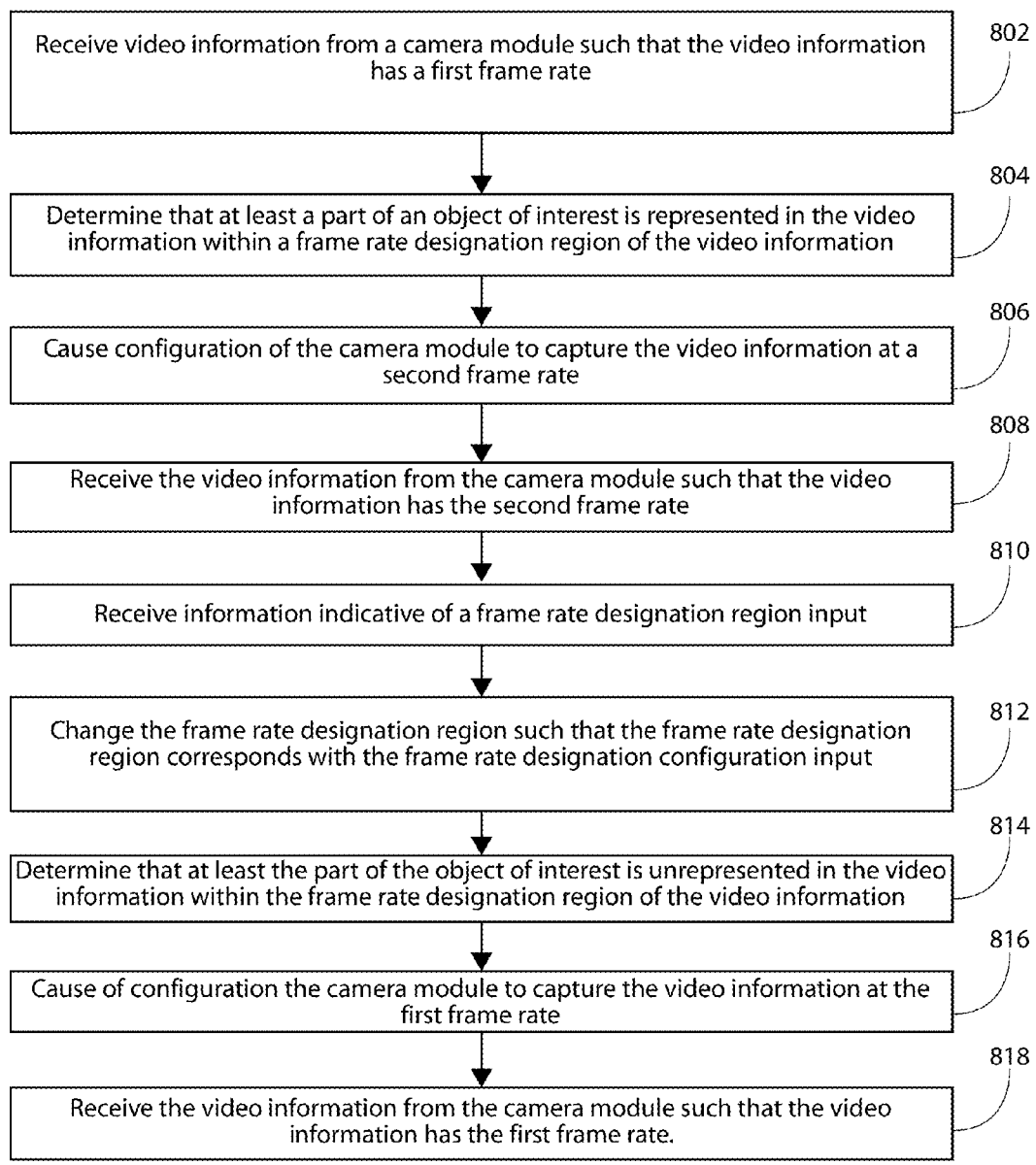
FIG. 8 is a flow diagram illustrating activities associated with determination of a frame rate based, at least in part, on a frame rate designation region according to at least one example embodiment.

FIG. 8 is a flow diagram illustrating activities associated with determination of a frame rate based, at least in part, on a frame rate designation region according to at least one example embodiment according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously described, in some circumstances, it may be desirable to change a frame rate designation region.

At block 802, the apparatus receives video information from a camera module such that the video information has a first frame rate, similarly as described regarding block 702 of FIG. 7. At block 804, the apparatus determines that at least a part of an object of interest is represented in the video information within a frame rate designation region of the video information, similarly as described regarding block 704 of FIG. 7. At block 806, the apparatus causes configuration of the camera module to capture the video information at a second frame rate, similarly as described regarding block 706 of FIG. 7. At block 808, the apparatus receives the video information from the camera module such that the video information has the second frame rate, similarly as described regarding block 708 of FIG. 7.

At block 810, the apparatus receives information indicative of a frame rate designation region input. The receipt and the frame rate designation region input may be similar as described regarding FIGS. 3A-3B.

At block 812, the apparatus changes the frame rate designation region such that the frame rate designation region corresponds with the frame rate designation configuration input. The change may be similar as described regarding FIGS. 3A-3B.

At block 814, the apparatus determines that at least the part of the object of interest is unrepresented in the video information within the frame rate designation region of the video information, similarly as described regarding block 710 of FIG. 7. At block 816, the apparatus causes configuration of the camera module to capture the video information at the first frame rate, similarly as described regarding block 712 of FIG. 7. At block 818, the apparatus receives the video information from the camera module such that the video information has the first frame rate, similarly as described regarding block 714 of FIG. 7.

Figure 9:
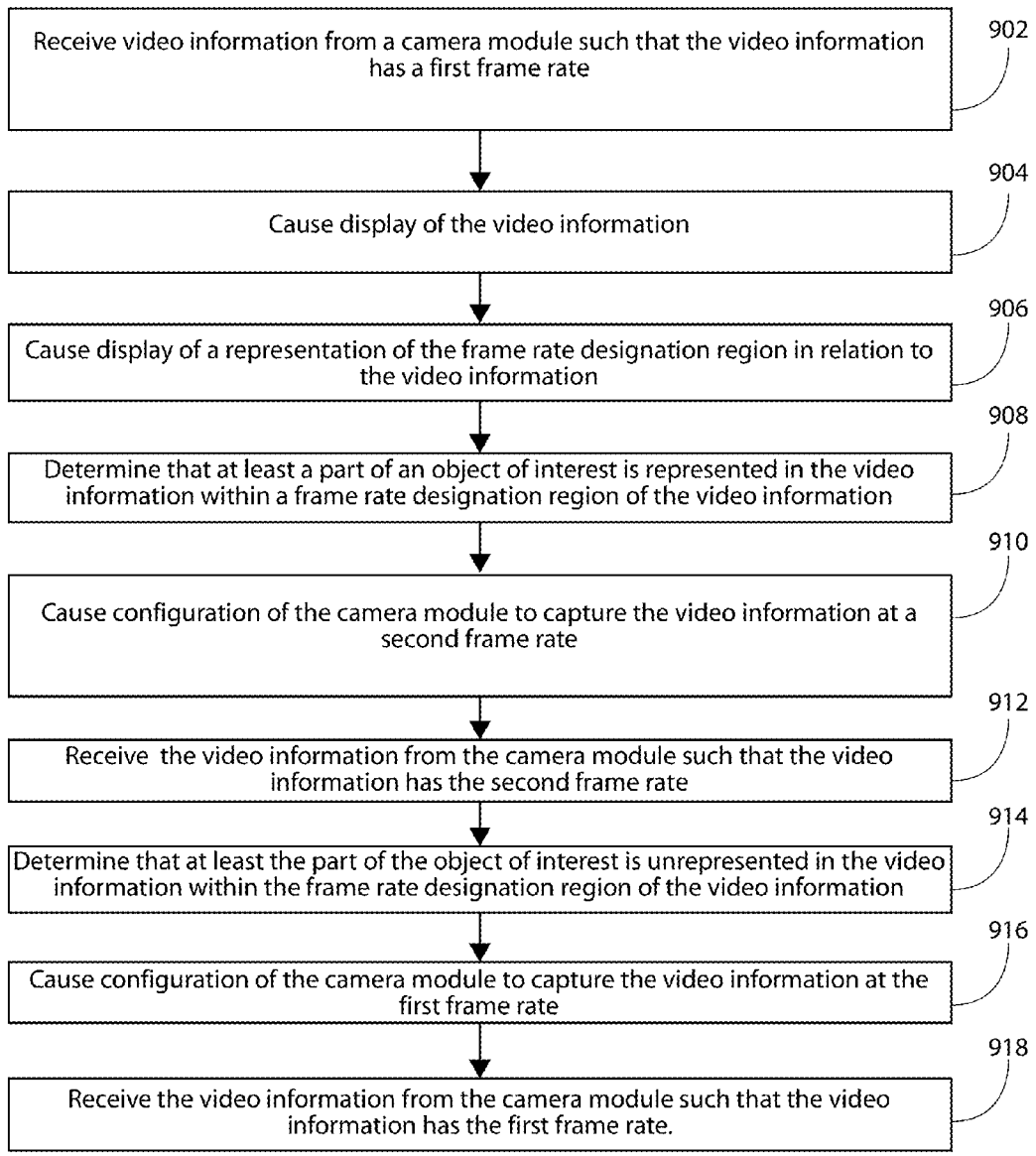
FIG. 9 is a flow diagram illustrating activities associated with determination of a frame rate based, at least in part, on a frame rate designation region according to at least one example embodiment.

FIG. 9 is a flow diagram illustrating activities associated with determination of a frame rate based, at least in part, on a frame rate designation region according to at least one example embodiment according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously described, in some circumstances, it may be desirable to cause display of video information.

At block 902, the apparatus receives video information from a camera module such that the video information has a first frame rate, similarly as described regarding block 702 of FIG. 7. At block 904, the apparatus causes display of the video information. The display of the video information may be similar as described regarding FIGS. 3A-3B.

At block 906, the apparatus causes display of a representation of the frame rate designation region in relation to the video information. The causation and the representation of the frame rate designation region may be similar as described regarding FIGS. 3A-3B.

At block 908, the apparatus determines that at least a part of an object of interest is represented in the video information within a frame rate designation region of the video information, similarly as described regarding block 704 of FIG. 7. At block 910, the apparatus causes configuration of the camera module to capture the video information at a second frame rate, similarly as described regarding block 706 of FIG. 7. At block 912, the apparatus receives the video information from the camera module such that the video information has the second frame rate, similarly as described regarding block 708 of FIG. 7. At block 914, the apparatus determines that at least the part of the object of interest is unrepresented in the video information within the frame rate designation region of the video information, similarly as described regarding block 710 of FIG. 7. At block 916, the apparatus causes configuration of the camera module to capture the video information at the first frame rate, similarly as described regarding block 712 of FIG. 7. At block 918, the apparatus receives the video information from the camera module such that the video information has the first frame rate, similarly as described regarding block 714 of FIG. 7.

Figure 10:
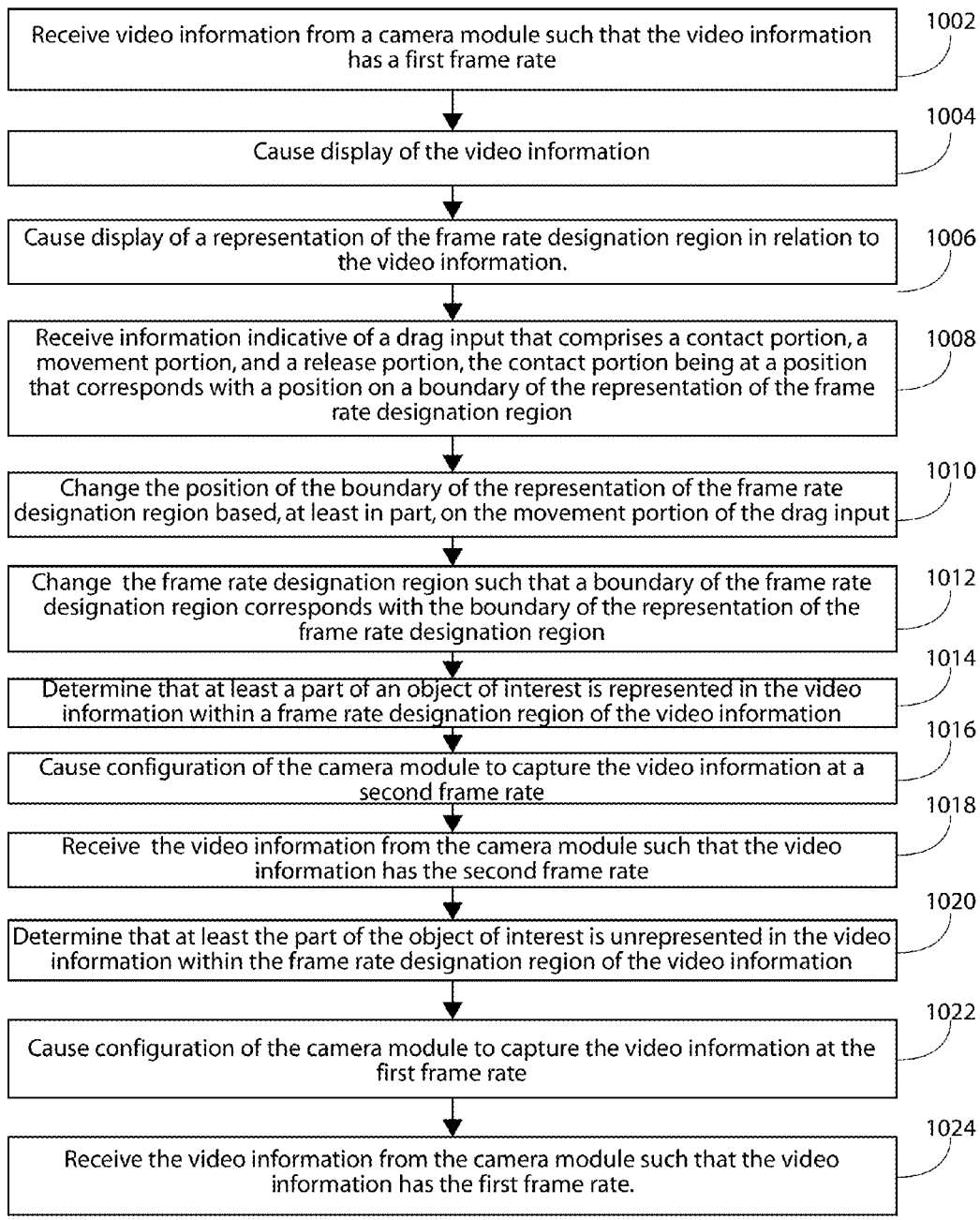
FIG. 10 is a flow diagram illustrating activities associated with determination of a frame rate based, at least in part, on a frame rate designation region according to at least one example embodiment.

FIG. 10 is a flow diagram illustrating activities associated with determination of a frame rate based, at least in part, on a frame rate designation region according to at least one example embodiment according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As previously described, in some circumstances, it may be desirable to change a frame rate designation region based on a drag input.

At block 1002, the apparatus receives video information from a camera module such that the video information has a first frame rate, similarly as described regarding block 702 of FIG. 7. At block 1004, the apparatus causes display of the video information, similarly as described regarding block 904 of FIG. 9. At block 1006, the apparatus causes display of a representation of the frame rate designation region in relation to the video information, similarly as described regarding block 906 of FIG. 9.

At block 1008, the apparatus receives information indicative of a drag input that comprises a contact portion, a movement portion, and a release portion, the contact portion being at a position that corresponds with a position on a boundary of the representation of the frame rate designation region. The drag input, the contact portion, the movement portion, the release portions, the position, and the boundary may be similar as described regarding FIGS. 3A-3B.

At block 1010, the apparatus changes the position of the boundary of the representation of the frame rate designation region based, at least in part, on the movement portion of the drag input. The change may be similar as described regarding FIGS. 3A-3B.

At block 1012, the apparatus changes the frame rate designation region such that a boundary of the frame rate designation region corresponds with the boundary of the representation of the frame rate designation region. The change and the boundary of the frame rate designation region may be similar as described regarding FIGS. 3A-3B.

At block 1014, the apparatus determines that at least a part of an object of interest is represented in the video information within a frame rate designation region of the video information, similarly as described regarding block 704 of FIG. 7. At block 1016, the apparatus causes configuration of the camera module to capture the video information at a second frame rate, similarly as described regarding block 706 of FIG. 7. At block 1018, the apparatus receives the video information from the camera module such that the video information has the second frame rate, similarly as described regarding block 708 of FIG. 7. At block 1020, the apparatus determines that at least the part of the object of interest is unrepresented in the video information within the frame rate designation region of the video information, similarly as described regarding block 710 of FIG. 7. At block 1022, the apparatus causes configuration of the camera module to capture the video information at the first frame rate, similarly as described regarding block 712 of FIG. 7. At block 1024, the apparatus receives the video information from the camera module such that the video information has the first frame rate, similarly as described regarding block 714 of FIG. 7.

Figure 11:
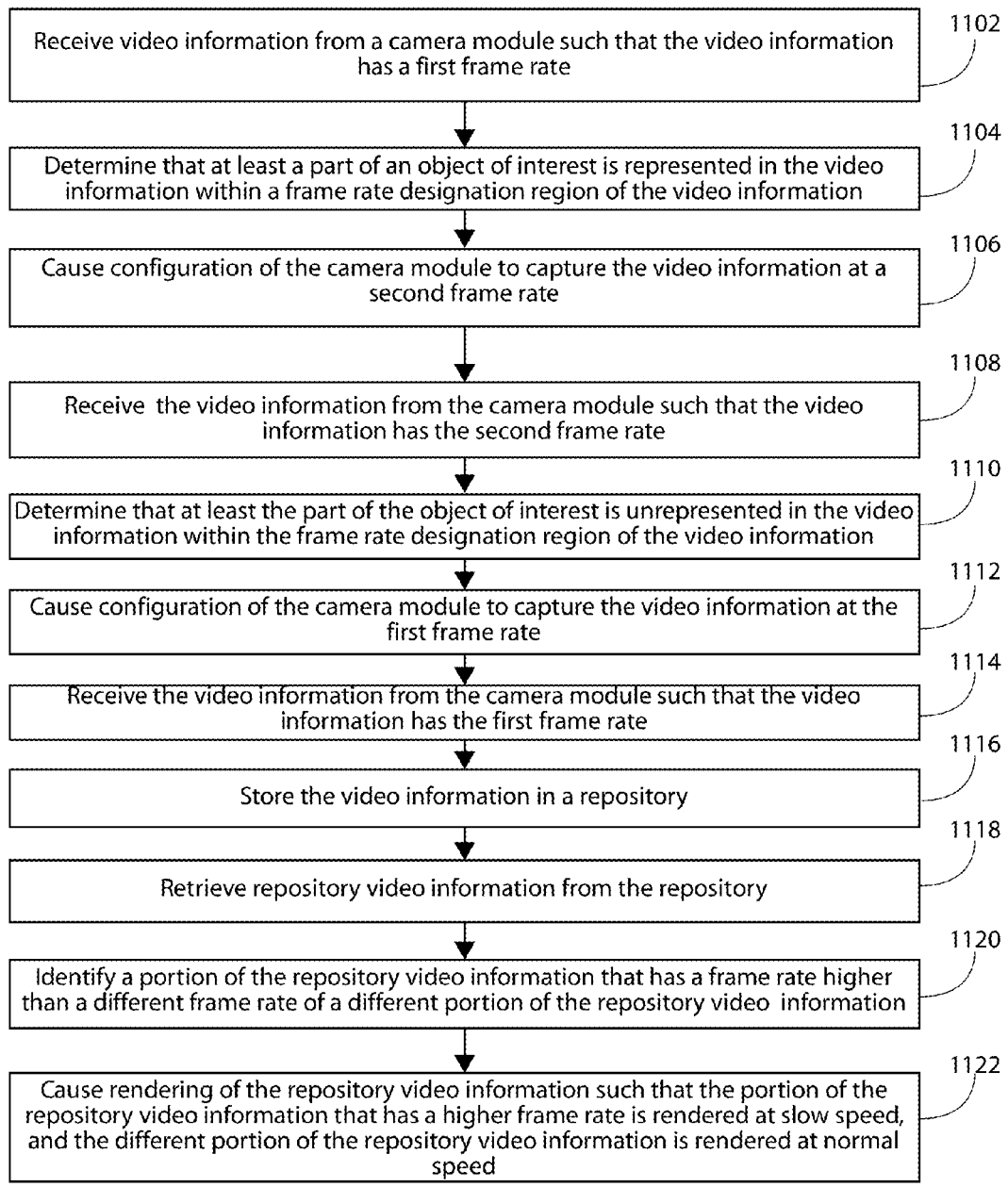
FIG. 11 is a flow diagram illustrating activities associated with determination of a frame rate based, at least in part, on a frame rate designation region according to at least one example embodiment.

FIG. 11 is a flow diagram illustrating activities associated with determination of a frame rate based, at least in part, on a frame rate designation region according to at least one example embodiment according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As previously described, in some circumstances, it may be desirable to store video information in a repository.

At block 1102, the apparatus receives video information from a camera module such that the video information has a first frame rate, similarly as described regarding block 702 of FIG. 7. At block 1104, the apparatus determines that at least a part of an object of interest is represented in the video information within a frame rate designation region of the video information, similarly as described regarding block 704 of FIG. 7. At block 1106, the apparatus causes configuration of the camera module to capture the video information at a second frame rate, similarly as described regarding block 706 of FIG. 7. At block 1108, the apparatus receives the video information from the camera module such that the video information has the second frame rate, similarly as described regarding block 708 of FIG. 7. At block 1110, the apparatus determines that at least the part of the object of interest is unrepresented in the video information within the frame rate designation region of the video information, similarly as described regarding block 710 of FIG. 7. At block 1112, the apparatus causes configuration of the camera module to capture the video information at the first frame rate, similarly as described regarding block 712 of FIG. 7. At block 1114, the apparatus receives the video information from the camera module such that the video information has the first frame rate, similarly as described regarding block 714 of FIG. 7.

At block 1116, the apparatus stores the video information in a repository. The storage and the repository may be similar as described regarding FIG. 2 and FIGS. 5A-5D.

At block 1118, the apparatus retrieves repository video information from the repository. The retrieval and the repository video information may be similar as described regarding FIGS. 5A-5D.

At block 1120, the apparatus identifies a portion of the repository video information that has a frame rate higher than a different frame rate of a different portion of the repository video information. The identification, the portion of the repository video information, different portion of the repository video information may be similar as described regarding FIGS. 5A-5D.

At block 1122, the apparatus causes rendering of the repository video information such that the portion of the repository video information is rendered at slow speed, and the different portion of the repository video information is rendered at normal speed. The display of the repository video information may be similar as described regarding FIGS. 5A-5D and FIGS. 6A-6B.

Embodiments of the invention may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 904 of FIG. 9 may be performed after block 906 of FIG. 9. Furthermore, if desired, one or more of the above-described functions may be optional or may be combined. For example, block 810 of FIG. 8 may be optional and/or combined with block 812 of FIG. 8.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
    at least one processor;
    at least one memory including computer program code, the memory and the computer program code configured to, working with the processor, cause the apparatus to perform at least the following:
        receive first video information from a camera module such that the first video information has a first frame rate;
        receive information indicative of a frame rate designation input identifying a boundary of a frame rate designation region;
        determine that at least a part of an object of interest is represented within the boundary of the frame rate designation region, wherein the frame rate designation region is a positional region within the first video information;
        instruct the camera module to capture second video information at a second frame rate based, at least in part, on the determination that at least a part of the object of interest is represented within the boundary of the frame rate designation region;
        receive the second video information from the camera module such that the second video information has the second frame rate;
        determine that at least a part of the object of interest is unrepresented within the boundary of the frame rate designation region;
        instruct the camera module to capture third video information at the first frame rate based, at least in part, on the determination that at least the part of the object of interest is unrepresented within the boundary of the frame rate designation region; and
        receive third video information from the camera module such that the third video information has the first frame rate.

2. The apparatus of claim 1, wherein the frame rate designation region has a width that is less than a representational width of the first video information, and the frame rate designation region has a height that is less than a representational height of the first video information.

3. The apparatus of claim 1, wherein the first frame rate is less than the second frame rate.

4. The apparatus of claim 1, wherein the memory includes computer program code configured to, working with the processor, cause the apparatus to perform:
    receive information indicative of an adjustment to the frame rate designation region input; and
    change the frame rate designation region such that the frame rate designation region corresponds with the adjustment to the frame rate designation region input.

5. The apparatus of claim 1, wherein the memory includes computer program code configured to, working with the processor, cause the apparatus to perform:
    instruct display of the first video information, the second video information, or the third video information; and
    instruct display of a representation of the boundary of the frame rate designation region in relation to the first video information, the second video information, or the third video information.

6. The apparatus of claim 5, wherein the representation of the frame rate designation region is a partially transparent overlay on the first video information, the second video information, or the third video information, such that the representation of the boundary of the frame designation region has dimensions that correspond with dimensions of the frame rate designation region.

7. The apparatus of claim 5, wherein the memory includes computer program code configured to, working with the processor, cause the apparatus to perform:
    receive information indicative of a drag input that comprises a contact portion, a movement portion, and a release portion, the contact portion being at a position that corresponds with a position on the representation of the boundary of the frame rate designation region;
    change the position of the representation of the boundary of the frame rate designation region based, at least in part, on the movement portion of the drag input; and
    change the frame rate designation region such that the boundary of the frame rate designation region corresponds with the boundary of the representation of the frame rate designation region.

8. The apparatus of claim 7, wherein the change of the position of the boundary of the representation of the frame rate designation region comprises at least one of repositioning of the representation of the frame rate designation region or changing a dimension of the representation of the frame rate designation region.

9. The apparatus of claim 1, wherein the apparatus comprises the camera module.

10. A method comprising:
    receiving first video information from a camera module such that the first video information has a first frame rate;
    receiving information indicative of a frame rate designation input identifying a boundary of a frame rate designation region;
    determining that at least a part of an object of interest is represented in the video information within the boundary of the frame rate designation region, wherein the frame rate designation region is a positional region within the video information;

instructing the camera module to capture second video information at a second frame rate based, at least in part, on the determination that at least a part of the object of interest is represented within the boundary of the frame rate designation region;

receiving the second video information from the camera module such that the second video information has the second frame rate;

determining that at least a part of the object of interest is unrepresented within the boundary of the frame rate designation region;

instructing the camera module to capture third video information at the first frame rate based, at least in part, on the determination that at least a part of the object of interest is unrepresented within the boundary of the frame rate designation region; and receiving the third video information from the camera module such that the third video information has the first frame rate.

11. The method of claim 10, wherein the frame rate designation region has a width that is less than a representational width of the first video information, and the frame rate designation region has a height that is less than a representational height of the first video information.

12. The method of claim 10, wherein the first frame rate is less than the second frame rate.

13. The method of claim 10, further comprising:
receiving information indicative of an adjustment to the frame rate designation region input; and
changing the frame rate designation region such that the frame rate designation region corresponds with the adjustment to the frame rate designation region input.

14. The method of claim 10, further comprising:
instructing display of the first video information, the second video information, or the third video information; and
instructing display of a representation of the boundary of the frame rate designation region in relation to the first video information, the second video information, or the third video information.

15. The method of claim 14, wherein the representation of the frame rate designation region is a partially transparent overlay on the first video information, the second video information, or the third video information, such that the representation of the boundary of the frame designation region has dimensions that correspond with dimensions of the frame rate designation region.

16. The method of claim 14, further comprising:
receiving information indicative of a drag input that comprises a contact portion, a movement portion, and a release portion, the contact portion being at a position that corresponds with a position on the representation of the boundary of the frame rate designation region;
changing the position of the representation of the boundary of the frame rate designation region based, at least in part, on the movement portion of the drag input; and
changing the frame rate designation region such that the boundary of the frame rate designation region corresponds with the boundary of the representation of the frame rate designation region.

17. At least one non-transitory, computer-readable medium encoded with instructions that, when executed by a processor, perform:
receive first video information from a camera module such that the video information has a first frame rate;
receive information indicative of a frame rate designation input identifying a boundary of a frame rate designation region;
determine that at least a part of an object of interest is represented within the boundary of the frame rate designation region, wherein the frame rate designation region is a positional region within the video information;
instruct the camera module to capture second video information at a second frame rate based, at least in part, on the determination that at least a part of the object of interest is represented within the boundary of the frame rate designation region;
receive the second video information from the camera module such that the second video information has the second frame rate;
determine that at least a part of the object of interest is unrepresented within the boundary of the frame rate designation region;
instruct the camera module to capture third video information at the first frame rate based, at least in part, on the determination that at least a part of the object of interest is unrepresented within the boundary of the frame rate designation region; and
receive the third video information from the camera module such that the third video information has the first frame rate.

18. The at least one non-transitory, computer-readable medium of claim 17, wherein the frame rate designation region has a width that is less than a representational width of the first video information, and the frame rate designation region has a height that is less than a representational height of the first video information.

19. The at least one non-transitory, computer-readable medium of claim 17, wherein the first frame rate is less than the second frame rate.

20. The at least one non-transitory, computer-readable medium of claim 17, further encoded with instructions that, when executed by a processor, perform:
receive information indicative of an adjustment to the frame rate designation region input; and
change the frame rate designation region such that the frame rate designation region corresponds with the adjustment to the frame rate designation region input.

* * * * *